United States Patent Office 3,419,331
Patented Dec. 31, 1968

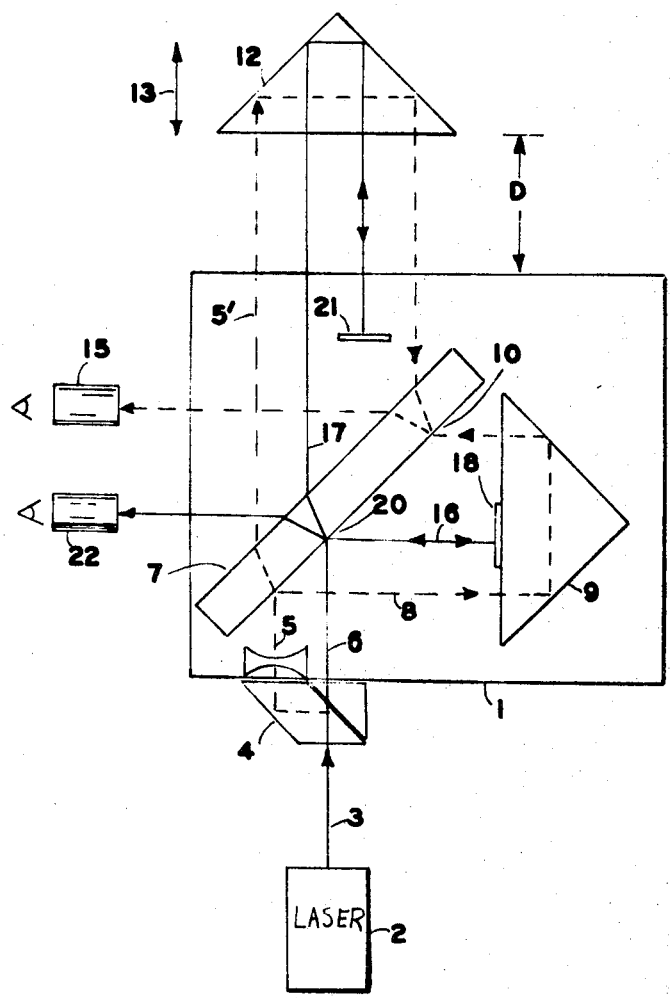

3,419,331
SINGLE AND DOUBLE BEAM INTERFEROMETER MEANS
George Diehr, Babylon, N.Y., assignor to OPTOmechanisms, Inc., Plainview, N.Y.
Filed Aug. 30, 1965, Ser. No. 483,486
2 Claims. (Cl. 356—106)

This invention relates to interferometers and more particularly to a combined single and double beam interferometer.

More particularly, the invention combines a single and a double beam interferometer on a single optical block so as to obtain the advantages of each type of interferometer.

Single beam interferometers transmit a beam from a reference point to a movable object from which it is reflected. The return beam is then compared with a portion of the original beam as a reference, in order to establish a fringe pattern and make the measurement of the distance which the movable reflector has moved.

The dual beam interferometer operates on the same principle except that it transmits a beam to the movable reflector and receives it from the movable reflector and then returns it to the movable reflector and receives it again, thus providing a double sensitivity of the measurement.

The advantage of the dual beam interferometer is that the dual beam interferometer has double the sensitivity of the single beam interferometer, but because of the return characteristcs of this type of interferometer, it is not sensitive to cosine errors in tracking. The present invention combines the advantages of both devices together on a single optical block.

The single beam interferometer will be used for precise tracking and the dual beam will be used for the double sensitivity for measurement. The cosine errors will, for all practical purposes, be equal to zero.

The advantage of a single beam interferometer is that the device must track within a thousandth of an inch of the optical path established by the interferometer. The instrument will not perform unless this condition is met.

Accordingly, a principal object of the invention is to provide new and improved interferometer means.

Another object of the invention is to provide new and improved combined single and double beam interferometer means on a single optical block.

Another object of the invention is to provide new and improved interferometer means having the accuracy of measurement of the double beam interferometer and the lack of cosine error which is inherent in the double beam interferometer.

Another object of the invention is to provide new and improved interferometer means using a laser beam.

These and other objects of the invention will be apparent in the following specification and drawing which is a plan view of the embodiment of the invention.

Referring to the figure, the invention comprises a base 1 which may be a plate of glass or marble of good optical stability.

A source of energy 2 is provided which may be a laser generator which generates a beam of energy. The beam source may be of any monochromatic light beam generator. The energy source provides a first beam 3 which is projected into a first beam splitter 4.

The beam 3 is split into two beams, 5 and 6. Beam 5, shown by the dotted line, is used in the single beam mode of operation, and beam 6 is used in the double beam mode of operation.

In the single beam mode of operation, the beam 5 is reflected by a second beam splitter 7 to provide a reference beam 8 which is reflected by the corner cube reflector 9 on to another portion 10 of the beam splitter 7.

The other portion 5' of the beam 5 is transmitted to a movable corner reflector 12 which may be mounted on an object which is movable in the direction of the arrow 13 in order to measure the distance D. This beam 5' is transmitted to the corner reflector 12 and then transmitted back again to the beam splitter 10, at which point its interference with the reference beam 8 establishes a fringe pattern at the surface 10 of the beam splitter 7. This fringe pattern may be observed by the telescope or eye piece 15 or other pick-up means.

In the double beam mode of operation, the beam 6 is split by the beam splitter 7 into two beams 16 and 17. The beam 16 is transmitted to the mirror surface 18 of the corner reflector 9 and transmitted back again to the surface 20 of the beam splitter 7.

The other portion 17 of the beam 6, that is the beam 17 is transmitted to the movable corner cube reflector 12 and transmitted back again to the fixed mirror 21. The beam 17 is then returned to the corner cube reflector and transmitted back again to the surface 20 of the beam splitter 7 where it is compared with the reference beam 16 and the fringe pattern noted by means of the telescope or eye piece 22.

All of the fixedly mounted optical pieces, such as the beam splitters 4 and 7, and the corner cube 9 and the mirror 21 are mounted on the base 1 for instance, by cementing or by mounting brackets or other equivalent means.

In operation, the single beam mode of operation is used for tracking the movable object and its corner cube, since the single beam will not operate if the movable object deviates away from the optical track.

Thereafter, the measurement is made by observing the fringe pattern of the double beam mode of operation namely the fringe pattern caused by the interference of the reference beam 16 and the doubly returned beam 17 at the point 20. This fringe pattern is observed in the telescope 22.

Therefore, the present invention provides a compact device which has the advantages of both the single beam and the double beam interferometers.

I claim:
1. Single and double beam interferometer means, comprising:
 a base, a source of first beam energy,
 a corner cube reflector movably mounted,
 a fixedly mounted first beam splitter on said base adapted to split said first beam into second and third beams,
 a fixedly mounted corner cube on said base,
 a first mirror mounted on a portion of the face of said fixedly mounted corner cube,
 a fixedly mounted second beam splitter on said base, positioned to receive said second and third beams and split them into said second and third reference beams and second and third variable beams,
 said second reference beam being transmitted to said fixedly mounted corner cube and reflected to said second beam splitter, and third reference beam being transmitted to said first mirror, means to transmit said second variable beam to said movable corner cube and to receive it from said movable corner cube, means to compare said second variable beam with said second beam, means to transmit said third variable beam to said movable corner cube and to receive it from said movable corner cube, second fixedly mounted mirror means to return said third variable beam to said movable corner cube and means to receive it from said movable corner cube, and means to compare said received third variable beam with said third reference beam.

2. Apparatus as in claim 1 having fringe comparison means.

References Cited

UNITED STATES PATENTS 2,583,596   1/1952   Root.

JEWELL H. PEDERSEN, *Primary Examiner.*

B. J. LACOMIS, *Assistant Examiner.*